United States Patent
Michalski

(10) Patent No.: US 10,830,629 B2
(45) Date of Patent: Nov. 10, 2020

(54) METHOD FOR DETERMINING THE FILL LEVEL OF A FILL SUBSTANCE LOCATED IN A CONTAINER

(71) Applicant: Endress + Hauser SE+Co. KG, Maulburg (DE)

(72) Inventor: Bernhard Michalski, Maulburg (DE)

(73) Assignee: ENDRESS + HAUSER SE+CO. KG, Maulburg (DE)

(*) Notice: Subject to any disclaimer, the term of this patent is extended or adjusted under 35 U.S.C. 154(b) by 325 days.

(21) Appl. No.: 15/774,355

(22) PCT Filed: Nov. 3, 2016

(86) PCT No.: PCT/EP2016/076590
§ 371 (c)(1),
(2) Date: May 8, 2018

(87) PCT Pub. No.: WO2017/092963
PCT Pub. Date: Jun. 8, 2017

(65) Prior Publication Data
US 2020/0249068 A1    Aug. 6, 2020

(30) Foreign Application Priority Data
Nov. 30, 2015    (DE) ........................ 10 2015 120 736

(51) Int. Cl.
*G01F 23/284*    (2006.01)
*G01S 13/22*    (2006.01)
(Continued)

(52) U.S. Cl.
CPC .......... *G01F 23/284* (2013.01); *G01S 13/225* (2013.01); *G01S 13/88* (2013.01);
(Continued)

(58) Field of Classification Search
CPC ............... G01F 23/284; G01F 23/2962; G01F 25/0061; G01F 23/0061; G01F 22/00;
(Continued)

(56) References Cited

U.S. PATENT DOCUMENTS 6,234,023 B1 * 5/2001 Collins .................. B67C 3/284
209/524
6,995,706 B2 * 2/2006 Ohlsson ................ G01F 23/284
342/118

(Continued)

FOREIGN PATENT DOCUMENTS

| CN | 12 80938 A | 1/2001 |
| CN | 1437700 A | 8/2003 |

(Continued)

OTHER PUBLICATIONS

Office Action dated Aug. 5, 2019, in corresponding Chinese application No. 201680069578.X.

(Continued)

*Primary Examiner* — Olumide Ajibade Akonai
(74) *Attorney, Agent, or Firm* — Bacon & Thomas, PLLC

(57) ABSTRACT

A method for determining the fill level of a fill substance located in a container. The method, which is based on the pulse travel time principle, is distinguished by the fact that extra-range echos can be recognized. For this, the method includes two method portions, in which microwave pulses are transmitted in the direction of the surface of the fill substance with different repetition rates in measuring cycles following one after the other. In each method portion, travel times are ascertained. The fill level is ascertained based on the first travel time and/or based on the second travel time, to the extent that they approximately agree. Otherwise, it is assumed that such echo pulses concern extra-range echos. Thus, by means of the method of the invention, it can be (Continued)

assured for pulse radar-based fill-level measurements that extra-range echos do not result in erroneous fill level values.

7 Claims, 3 Drawing Sheets

(51) Int. Cl.
    *G01S 13/88*     (2006.01)
    *G01F 23/296*     (2006.01)
    *G01S 7/03*     (2006.01)
    *G01F 25/00*     (2006.01)
    *H01Q 1/22*     (2006.01)

(52) U.S. Cl.
    CPC ...... *G01F 23/2962* (2013.01); *G01F 25/0061* (2013.01); *G01S 7/032* (2013.01); *H01Q 1/225* (2013.01)

(58) Field of Classification Search
    CPC ...... G01F 23/0076; G01S 13/88; G01S 7/032; G01S 13/10; G01S 7/03; G01S 13/08; G01S 13/103; G01S 13/30; G01S 7/40; G01S 7/2921; H01Q 1/225; H01Q 13/02
    USPC ...................................................... 73/290 V
    See application file for complete search history.

(56) References Cited

U.S. PATENT DOCUMENTS

| | | | | |
|---|---|---|---|---|
| 7,542,870 B2* | 6/2009 | Reimer | ............... | G01F 23/2962 702/155 |
| 7,966,136 B2* | 6/2011 | Reimer | ............... | G01F 25/0061 702/55 |
| 2010/0162811 A1* | 7/2010 | Malinovskiy | ....... | G01F 23/2962 73/290 V |
| 2010/0201563 A1 | 8/2010 | Flasza | | |
| 2012/0186339 A1* | 7/2012 | Feisst | ................ | G01F 23/284 73/290 V |
| 2012/0265486 A1* | 10/2012 | Klofer | ................ | G01F 23/284 702/166 |
| 2013/0320145 A1* | 12/2013 | McGillis | ............ | B64D 15/06 244/134 C |
| 2014/0085130 A1 | 3/2014 | Edvardsson | | |
| 2015/0168204 A1* | 6/2015 | Meyer | ............... | G01F 23/0061 73/290 V |
| 2015/0253177 A1* | 9/2015 | Blodt | ................ | G01F 23/284 324/644 |

FOREIGN PATENT DOCUMENTS

| | | |
|---|---|---|
| CN | 203224275 U | 10/2013 |
| CN | 10 4685327 A | 6/2015 |
| DE | 10 2007 013 714 A1 | 10/2008 |
| DE | 10 2012 109 101 A1 | 3/2014 |
| DE | 10 2014 107 249 A1 | 11/2015 |
| DE | 10 2015 120 736 A1 | 6/2017 |
| EP | 0 451 987 A2 | 10/1991 |
| EP | 1 972 961 A2 | 9/2008 |
| WO | WO-2010040580 A1 * | 4/2010 ........... G01F 23/284 |

OTHER PUBLICATIONS

German Search Report, German PTO, Munich, dated Sep. 21, 2016.
International Search Report, EPO, The Netherlands, dated Mar. 6, 2017.

* cited by examiner

1

METHOD FOR DETERMINING THE FILL LEVEL OF A FILL SUBSTANCE LOCATED IN A CONTAINER

TECHNICAL FIELD

The invention relates to a method for determining the fill level of a fill substance located in a container as well as to a fill-level measuring device suitable for performing such method.

BACKGROUND DISCUSSION

In automation technology, especially in process automation technology, field devices are often applied, which serve for registering and/or influencing process variables. Serving for registering process variables are sensors, which are integrated into, for example, fill level measuring devices, flow measuring devices, pressure- and temperature measuring devices, pH-redox potential measuring devices, conductivity measuring devices, etc., which register the corresponding process variables, fill level, flow, pressure, temperature, pH-value, redox potential, and conductivity. Serving for influencing process variables are actuators, such as, for example, valves or pumps, via which the flow of a liquid in a pipeline section, and the fill level in a container, can be changed. Referred to as field devices are, in principle, all devices, which are applied near to the process and which deliver, or process, process relevant information. In connection with the invention, the terminology, field devices, thus refers also to remote I/Os, radio adapters, and, generally, electronic components, which are arranged at the field level. A large number of such field devices are produced and sold by the firm, Endress+Hauser.

For measuring fill-level, contactless measuring methods are preferred, since they are robust and require little maintenance. A further advantage is the ability to measure steplessly. For this, special radar-based measuring methods, which work according to the pulse travel time principle, have become common. In the case of these measuring methods, which are also known under the name, pulse radar, short microwave pulses are sent periodically toward the fill substance with a predetermined repetition rate, e.g. a repetition rate in an order of magnitude of 1 to 10 MHz, and with center frequencies in the gaga hertz range. In the case of pulse radar-based fill-level measuring devices, such as, for example, the series FMR20 of Endress+Hauser, this happens with a repetition rate of about 7 MHz. The microwave pulses transmitted toward the fill substance are reflected on the surface of the fill substance. The reflected echo pulses are then received back after a travel time dependent on the fill level. Fill level is ascertained based on the travel time.

In this measuring method, a potential source of error is that not the echo pulse reflected on the surface of the fill substance is received and taken into consideration for determining the fill level, but, instead, incorrectly, a disturbance echo. Such disturbance echos can be brought about by reflections of microwave pulses on disturbing bodies or on the inner surfaces of the container. Partially, disturbance echoes can, however, be recognized and excluded from the further processing by performing a reference measurement in the case of empty tank and reconciling subsequent measurements with this reference data. Such a method is described in the international publication, WO 2011/076478 A2.

Disturbance echos, which are not directly brought about by stationary disturbing bodies, cannot, however, be reliably detected by such a reference measurement. This is true especially in the case of so called extra-range echos. Such echos have as a result of multiple reflections in the container an extra long travel time such that, due to the comparatively high pulse-repetition rate in the MHz-region, they are received only after transmission of the following microwave pulse.

SUMMARY OF THE INVENTION

An object of the invention is, therefore, to provide a method, with which extra-range echos can be recognized.

The invention achieves this object by a method for determining fill level of a fill substance located in a container. The method, which is based on the pulse travel time method, includes method portions as follows:

In a first method portion with a first repetition rate in measuring cycles following one after the other,
  a first microwave pulse with a first center frequency is transmitted in the direction of the surface of the fill substance,
  after transmitting the first microwave pulse, at least one first echo pulse is received.
In such case, a first travel time between transmission of the first microwave pulse and receipt of the at least one first echo pulse is ascertained.
In a second method portion with a second repetition rate in measuring cycles following one after the other,
  a second microwave pulse with a second center frequency is transmitted in the direction of the surface of the fill substance,
  after transmitting the second microwave pulse, at least one second echo pulse is received,
wherein a second travel time between transmission of the second microwave pulse and receipt of the at least one second echo pulse is ascertained.

To the extent that the first travel time and the second travel time approximately agree, the fill level is then ascertained based on the first travel time and/or based on the second travel time. Otherwise, it is assumed that such echo pulses are extra-range echos. By means of the method of the invention, it can thus be assured in the case of pulse radar-based fill-level measurements that no erroneous fill level-values are ascertained as a result of extra-range echos.

In a further development of the method, at least in one measuring cycle of the first method portion, the first microwave pulse is transmitted with a predefined delay, which corresponds approximately to the reciprocal of twice the first center frequency, and/or at least in one measuring cycle of the second method portion the second microwave pulse is transmitted with a predefined delay, which corresponds approximately to the reciprocal of twice the second center frequency. This delay corresponds to a half wavelength of the first or second center frequency, as the case, may be. Advantageous in the delay of individual microwave pulses is that, as a result of an averaging of the microwave pulses over the measuring cycles, an attenuation of the signal strength of extra-range echos is effected. The signal strength of echo pulses $E_1$ $E_2$ from the reflection of microwave pulses $S_1$, $S_2$ on the surface of the fill substance 2 is, in such case, not reduced. This further development provides an opportunity to detect extra-range echos not only by a finding of different first and second travel times. Extra-range echos can in the case of sequential use of this further development supplementally also be recognized by the fact that, as a result of the averaging of the microwave pulses over the measuring cycles, the signal strength of the corresponding echo pulses are sequentially lessened, or increased, as the case may be.

In a preferred variant of this further development, for the case, in which, in multiple measuring cycles of the first method portion and/or of the second method portion, the microwave pulse is transmitted delayed, which measuring cycle of the first microwave pulse and/or the second microwave pulse are/is transmitted delayed is randomly controlled. In this way, the signal strength of the extra-range echos $E_1$, $E_2$ can be lessened up to 20 dB.

In the scope of the invention, it is, on the one hand, possible, that the first method portion and the second method portion are performed simultaneously. Advantageously, however, the first method portion and the second method portion are performed alternatingly. In such case, the alternation rate as well as the time ratio between the two method portions can be freely set depending on requirements.

Furthermore, the object of the invention is achieved by a fill-level measuring device for performing at least one variant of the method as above described. For this, a fill-level measuring device comprises:

A pulse producing unit for producing the first microwave pulse and/or the second microwave pulse, a transmitting/receiving unit for transmitting the first microwave pulse and/or the second microwave pulse, as well as for receiving the at least one first echo pulse and/or the at least one second echo pulse, and an evaluation unit for ascertaining fill level based on the first travel time and/or based on the second travel time, and/or for controlling the pulse producing unit.

The components of the fill-level measuring device are generally known from the state of the art. Thus, it is also possible to implement the method of the invention by corresponding extension of software in already existing fill level measuring devices.

A further development of the fill level measuring device of the invention provides that the pulse producing unit includes a delay unit for delay of the emitting of the first microwave pulse and/or the second microwave pulse. By means of this delay unit, such as already described in connection with the method of the invention, an attenuation of the signal strength of extra-range echos can be effected. Accordingly, extra-range echos can, by sequential application of the delay unit, be supplementally detected also by the fact that the signal strength of the corresponding echo pulses sequentially lessens, or increases, as the case may be.

BRIEF DESCRIPTION OF THE DRAWINGS

The invention will now be explained based on the appended drawing, the figures of which show as follows.

DETAILED DISCUSSION IN CONJUNCTION WITH THE DRAWINGS

Figure 1A:
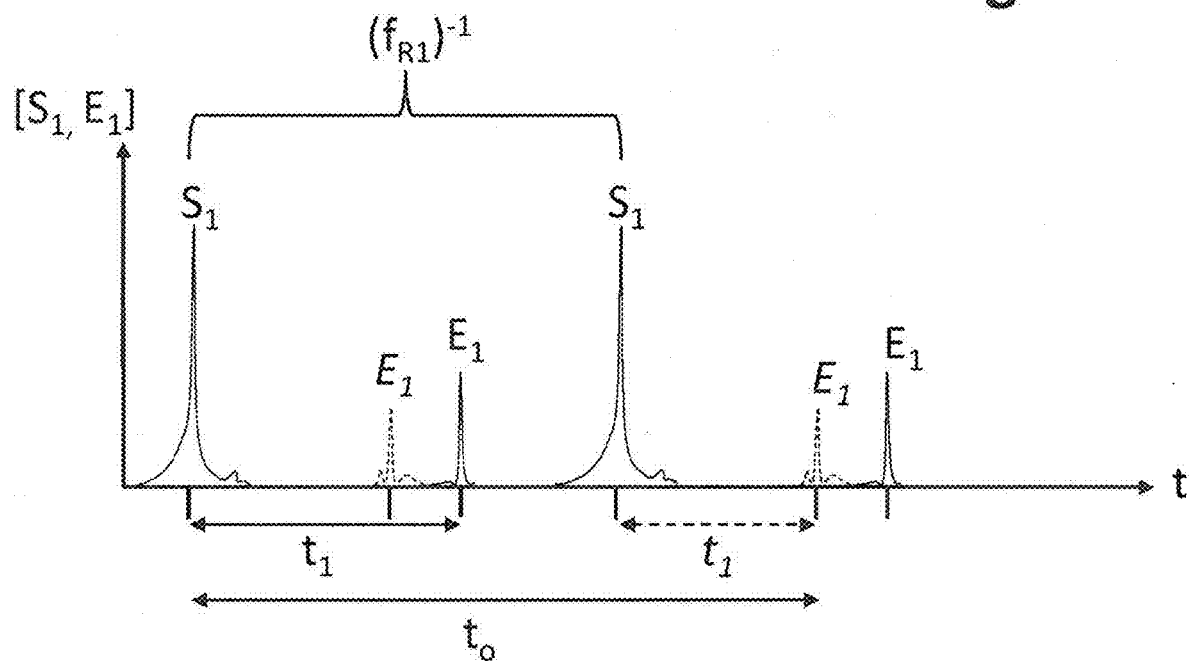
FIGS. 1a, and 1b are two schematic representations of transmitted microwave pulses and resulting received echo pulses as a function of time.
Figure 1B:
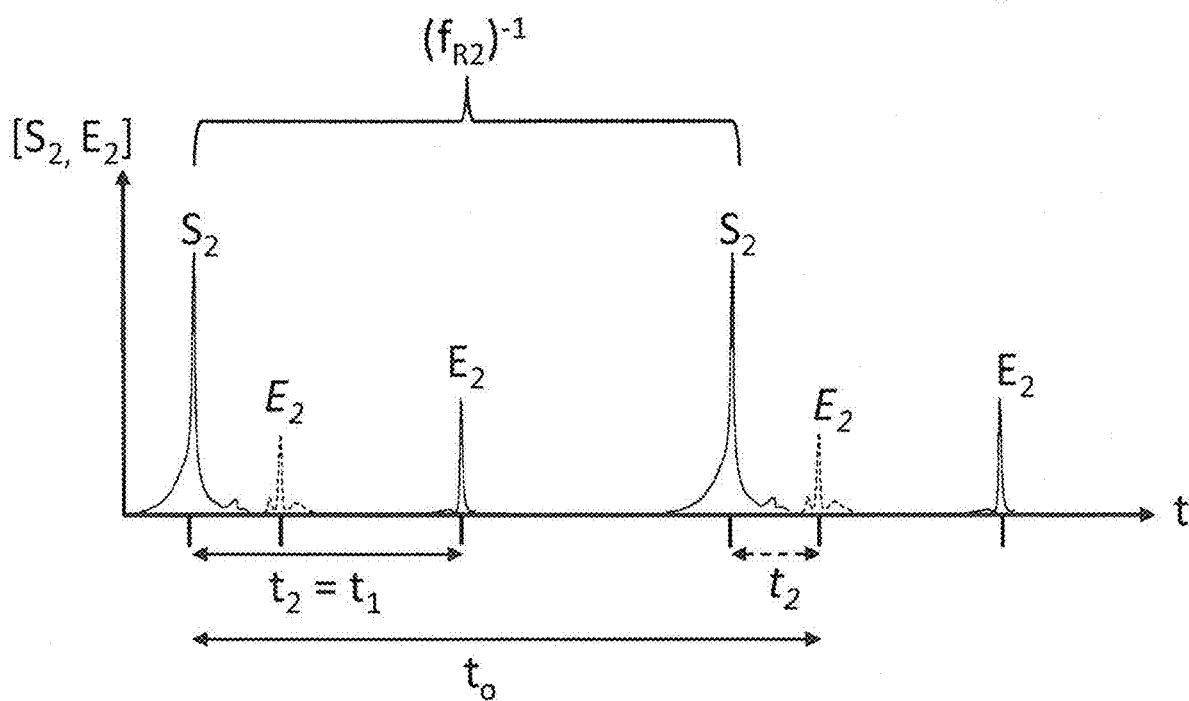

FIGS. 1a and 1b illustrate the functional principle of the method of the invention for determining the fill level L of a fill substance 2 located in a container 1.

The method is distinguished by the fact that extra-range echos are recognized as such. A fundamental feature of the method is that microwave pulses $S_1$, $S_2$ are transmitted with at least two different repetition rates $f_{R1}$, $f_{R2}$. In this connection, FIGS. 1a and 1b show the transmitted microwave pulses $S_1$, $S_2$ as well as associated, received echo pulses $E_1$, $E_2$ as a function of time, wherein the signal strengths [$S_1$, $S_2$, $E_1$, $E_2$] are plotted on the ordinate.

Two different cases are considered in FIGS. 1a and 1b: In the first case, the echo pulses $E_1$, $E_2$ are extra-range echos (shown as dashed lines). In the second case, the echo pulses $E_1$, $E_2$ are fill substance echos (shown as solid lines), such as required for determining the fill level L from the reflection of the microwave pulses $S_1$, $S_2$ on the surface of the fill substance 2.

In FIG. 1a, the microwave pulses $S_1$ are transmitted with a first repetition rate $f_{R1}$. A first travel time $t_1$ can be associated with each of the echo pulses $E_1$. In contrast therewith, in FIG. 1b, the microwave pulses $S_2$ are transmitted with a slower, second repetition rate $f_{R2}$. Also in this case, a second travel time $t_2$ can be associated with the echo pulses $E_2$. As can be seen by comparing FIGS. 1a and 1b, in the case of the echo pulses $E_2$, which result from reflection of the microwave pulse $S_2$ on the surface of the fill substance 2, the second travel time $t_2$ does not change in comparison with the first travel time $t_1$. The behavior is different in the case of the extra-range echos: the second travel time $t_2$ is less compared with the first travel time $t_1$. This effect is attributed to the fact that the travel time $t_0$ of extra-range echos remains constant with reference to the next to last microwave pulse $S_1$, $S_2$, not, however, with reference to the last microwave pulse $S_1$, $S_2$.

According to the invention, it is thus detected whether an echo pulse $E_1$, $E_2$ is an extra-range-echo by comparing the first travel time $t_1$ and the second travel time $t_2$ with one another. When the first travel time $t_1$ and the second travel time $t_2$ do not agree, then the echo is an extra-range echo. Otherwise, it can be assumed from the comparison that an extra-range echo is not involved, so that the fill level L is determined based on the equal travel times $t_1$, $t_2$.

Figure 2:
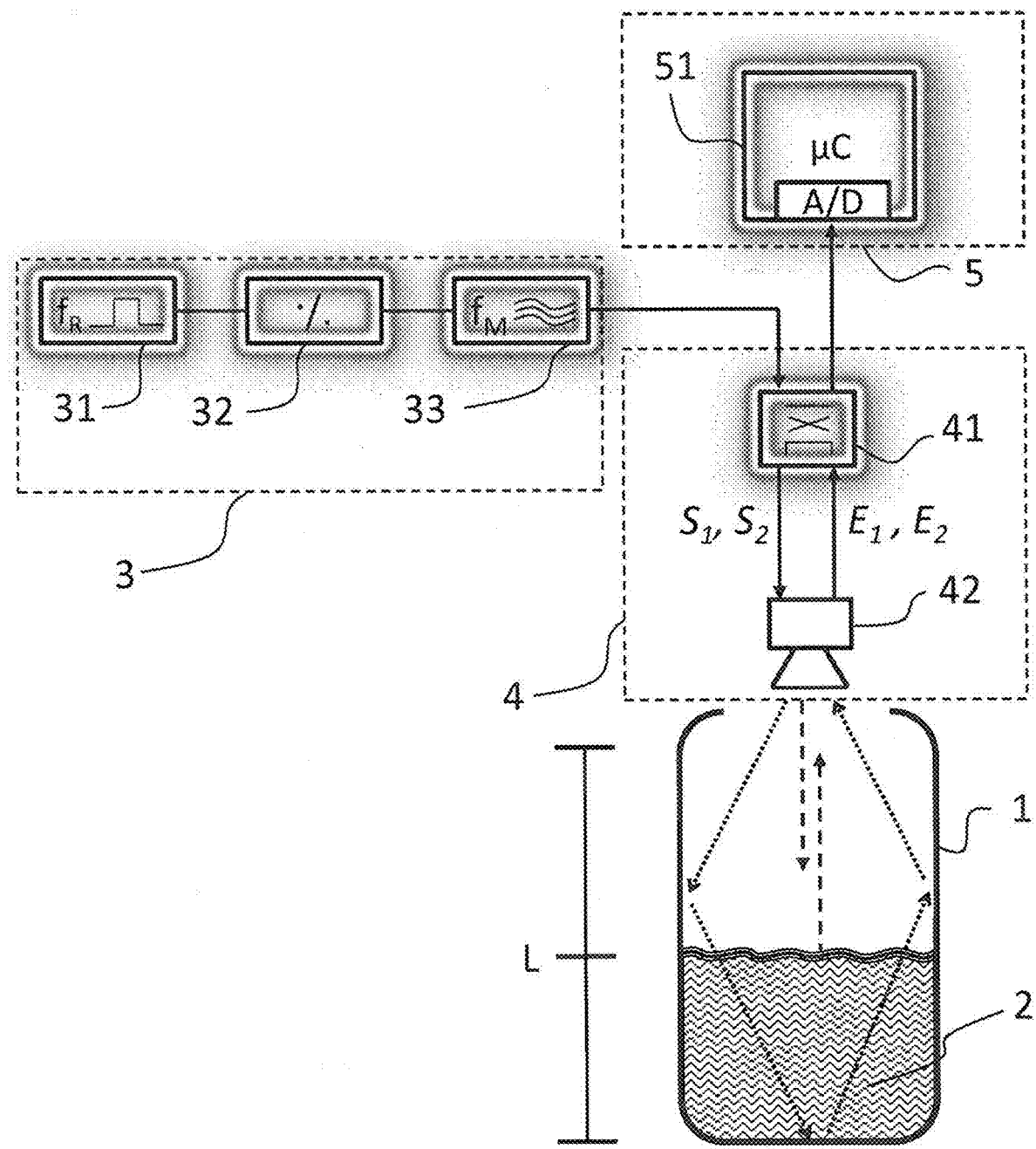
FIG. 2 is a first embodiment of a fill level measuring device for performing the method of the invention.

FIG. 2 shows a very simple embodiment of a fill level measuring device for performing the method of the invention. It includes a pulse producing unit 3 for producing the microwave pulses $S_1$, $S_2$. As known from the state of the art, serving for this is a first pulse generator 31 and a first high-frequency oscillator 33, which has a predetermined center frequency $f_m$ in the GHz-region. In order to be able to transmit the microwave pulses $S_1$ $S_2$ with different repetition rates $f_{R1}$, $f_{R2}$, the pulse producing unit 3 includes a frequency divider 32. With this, a predetermined repetition rate $f_R$ of the pulse generator 31 is variably divided down in such a manner that sequentially in alternation two different repetition rates $f_{R1}$, $f_{R2}$ get set. In the case of this embodiment, the microwave pulses $S_1$, $S_2$ of both method portions are produced by the same pulse producing unit 3. Therefore, it is only possible to perform the first method portion and the second method portion of the method of the invention alternatingly.

In the scope of the invention, however, any other method for production of microwave pulses $S_1$, $S_2$ with different repetition rates $f_{R1}$, $f_{R2}$ can be used. This could be achieved, for example, by another pulse producing unit supplementally to the illustrated pulse producing unit 3. In such case, an option would be that two high-frequency oscillators with mutually differing center frequencies $f_{M1}$, $f_{M2}$ are implemented. In this case, an option would be that the first method portion and the second method portion of the method of the invention are performed at the same time.

In the case of the fill-level measuring device shown in FIG. 2, one transmitting/receiving unit 4 serves for transmitting and receiving both the microwave pulses $S_1$, $S_2$ and the echo pulses $E_1$, $E_2$. For this, the transmitting/receiving unit 4 includes a transmitting/receiving separator, duplexer or directional coupler 41 as well as an antenna 42. Instead of the one antenna 42, another option is to use a plurality of antennas for separate sending and receiving. In such case, the transmitting/receiving separator, duplexer or directional coupler 41 would not be required.

Serving for ascertaining the fill level L based on the travel times $t_1$, $t_2$ is an evaluation unit 5. It includes a microcontroller 51 for A/D conversion of the echo pulses $E_1$, $E_2$ as well as for calculating the travel times $t_1$, $t_2$.

FIG. 2 shows only signal paths. Control paths, for example, for operating of the first pulse generator 31 and/or the first frequency divider 32 by the microcontroller 51 are not shown for reasons of perspicuity.

Figure 3:
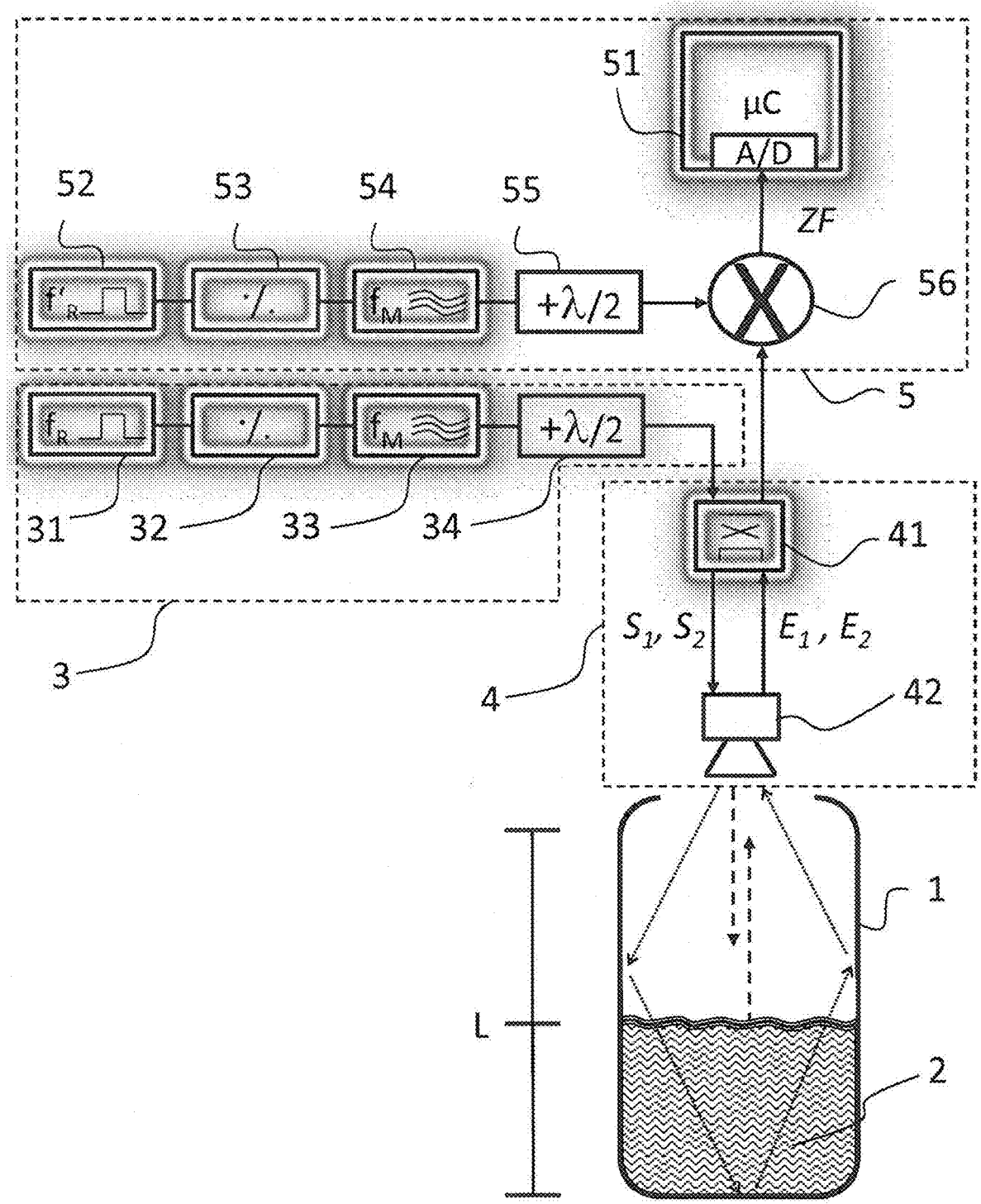
FIG. 3 is a second embodiment of a fill level measuring device for performing the method of the invention.

FIG. 3 shows a further development of the fill level measuring device shown in FIG. 2. In the case of the fill-level measuring device shown in FIG. 3, a sampling and a therewith connected time expansion of the echo pulses $E_1$, $E_2$ occurs according to the state of the art, in order to facilitate the ascertaining of the travel times $t_1$, $t_2$ based on a resulting intermediate frequency signal IF. The sampling occurs in a mixer 56 by a sampling signal, which is produced analogously to the microwave pulses $S_1$, $S_2$ by a reference pulse generator 52, a second frequency divider 53 and a second high-frequency oscillator 54. In such case, it is necessary for performing the method of the invention that the first frequency divider 32 and the second frequency divider 53 have the same divisor.

The fill-level measuring device shown in FIG. 3 includes, moreover, two delay units 34, 55. They serve to delay the transmission of the individual microwave pulses $S_1$, $S_2$ or the sampling signal, as the case may be, by a half wavelength (with reference to the center frequency $f_M$ of the high-frequency oscillators 33, 54). In such case, advantageously, it is controlled randomly, whether the microwave pulses $S_1$, $S_2$ and the sampling signal are delayed, By this additional measure, the signal strength of the extra-range echos $E_1$, $E_2$ can be lessened up to 20 dB, without that the signal strength of the echo pulses $E_1$ $E_2$ resulting from reflection of the microwave pulse $S_1$, $S_2$ on the surface of the fill substance 2 is reduced. Also in the case of this measure, it is necessary that the two delay units 34, 55 are operated concordantly. This means that either the two delay units 34, 55 instantaneously delay the transmission of the microwave pulses $S_1$, $S_2$, or neither of the two is delayed. Alternatively to the embodiment shown in FIG. 3, an option would be that the delay units 34, 55 are arranged between the frequency dividers 32, 53 and the high-frequency oscillators 33, 54.

This measure, which serves for reducing the signal strength of extra-range echos $E_1$, $E_2$, could also be applied in the case of the embodiment of the fill level measuring device shown in FIG. 2. In this case, the extra effort would be limited to only a single delay unit in the pulse producing unit 3.

The invention claimed is:

1. A method for determining fill level of a fill substance located in a container, comprising the steps as follows:
in a first method step with a first repetition rate in measuring cycles following one after the other,
a first microwave pulse with a first center frequency is transmitted in the direction of the surface of the fill substance,
after transmitting the first microwave pulse, at least one first echo pulse received,
wherein a first travel time between transmission of the first microwave pulse and receipt of the at least one first echo pulse is ascertained; and,
in a second method step with a second repetition rate in measuring cycles following one after the other,
a second microwave pulse with a second center frequency is transmitted in the direction of the surface of the fill substance,
after transmitting the second microwave pulse, at least one second echo pulse is received,
wherein a second travel time between transmission of the second microwave pulse and receipt of the at least one second echo pulse is ascertained,
wherein, to the extent that said first travel time and said second travel time approximately agree, the fill level is ascertained based on said first travel time and/or based on said second travel time.

2. The method as claimed in claim 1, wherein:
at least in one measuring cycle of said first method step, the first microwave pulse is transmitted with a predefined delay, which corresponds approximately to the reciprocal of twice the first center frequency; and/or
at least in one measuring cycle of said second method step, the second microwave pulse is transmitted with a predefined delay, which corresponds approximately to the reciprocal of twice the second center frequency.

3. The method as claimed in claim 2, wherein:
for the case, in which, in multiple measuring cycles of said first method step and/or of said second method step, the microwave pulse is transmitted delayed, in which measuring cycle the first microwave pulse and/or the second microwave pulse are/is transmitted delayed is randomly controlled.

4. The method as claimed in claim 1, wherein:
said first method step and said second method step are performed simultaneously.

5. The method as claimed in claim 1, wherein:
said first method step and said second method step are performed alternately.

6. A fill-level measuring device for determining fill level of a fill substance located in a container, comprising:
a pulse producing unit for producing with a first repetition rate a first microwave pulse with a first center frequency in measuring cycles following one after another, as well as for producing with a second repetition rate a second microwave pulse with a center frequency in measuring cycles following one after another,
a transmitting/receiving unit for transmitting the first microwave pulse and the second microwave pulse in the direction of the surface of the fill substance, as well as for receiving the at least one first echo pulse and/or the at least one second echo pulse after transmitting the first microwave pulse and the second microwave pulse; and
an evaluation unit for ascertaining a first travel time between transmission of the first microwave pulse and receipt of the at least one first echo pulse,
for ascertaining a second travel time between transmission of the second microwave pulse and receipt of the at least one second echo pulse, as well as for for ascertaining fill level based on said first travel time and/or based on said second travel time to the extend that said first travel time and said second travel time approximately agree.

7. The fill-level measuring device as claimed in claim 6, wherein:

said pulse producing unit includes a delay unit for delay of the emitting of the first microwave pulse and/or of the second microwave pulse.

\* \* \* \* \*